Sept. 15, 1959     C. E. BUTLIN     2,904,065
VALVE FOR FUEL PUMPS AND THE LIKE

Filed May 10, 1957

INVENTOR.
CHARLES EDWARD BUTLIN
BY

United States Patent Office 2,904,065
Patented Sept. 15, 1959

2,904,065

VALVE FOR FUEL PUMPS AND THE LIKE

Charles Edward Butlin, Erie, Pa., assignor to Perry Plastics, Inc., Erie, Pa., a corporation of Pennsylvania Application May 10, 1957, Serial No. 658,344

5 Claims. (Cl. 137—454.4)

This invention relates to valves and, more particularly, to valves used in fuel pumps of internal combustion engines and the like.

In fuel pumps for internal combustion engines, the valves are frequently made of metallic material with metal seating surfaces ground to form a liquid tight seal. Valves made in this manner are subject to wear and when the seat is worn appreciably, the valve has a tendency to leak and does not function efficiently. Further, valves of this type are expensive to manufacture and their construction requires costly materials.

Further, valves which were made for use in fuel pumps previously were of a design which was not suitable for molding from a plastic material. In addition, the problems of preventing a plastic material from warping due to internal stresses were an inhibiting factor in discouraging persons from attempting to mold a fuel pump valve from plastic. By providing the improved valve design disclosed herein, the parts are so arranged that the natural tendency of the plastic to warp will not cause distortion in a direction which will cause malfunction of the valve.

It is, accordingly, an object of this invention to overcome the above and other disadvantages in prior fuel pump valves and, more particularly, it is an object of this invention to provide a valve for a fuel pump which is simple in construction, economical to manufacture, and simple and efficient in operation.

Another object of the invention is to provide a valve for use in an automobile fuel pump wherein all parts of the valve are made from a molded plastic material.

A further object of the invention is to provide an improved design of valve wherein a plastic material is used for all of the parts thereof.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 1:
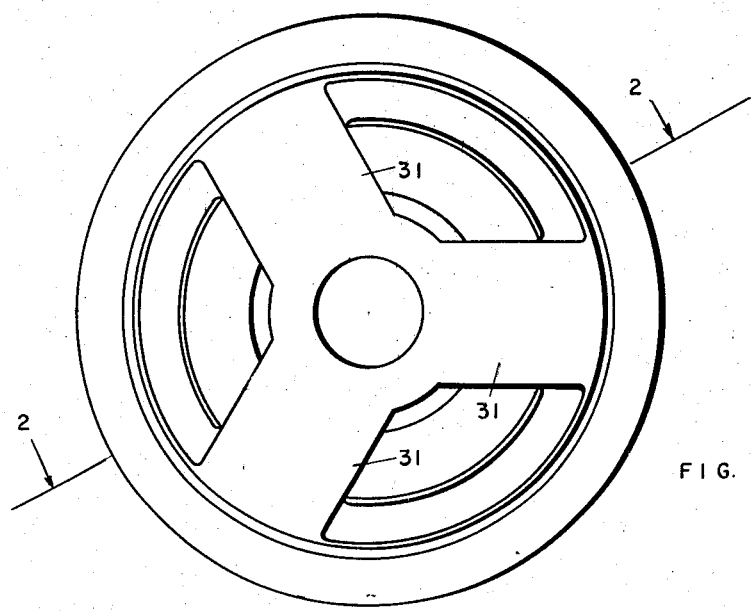
Fig. 1 is a top view of a valve according to the invention.
Figure 2:
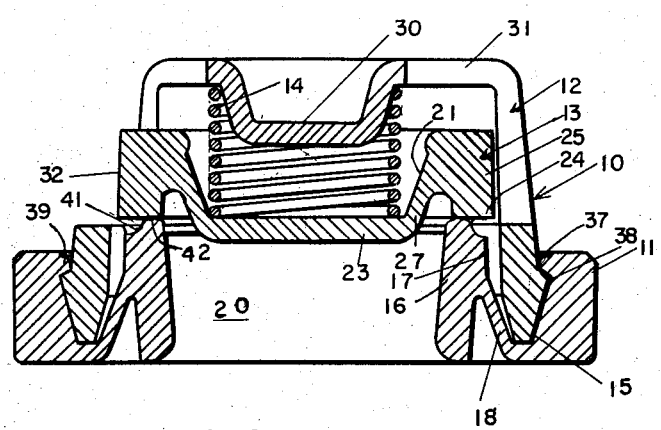
Fig. 2 is a cross sectional view taken on line 2—2 of Fig. 1.

Now with more specific reference to the drawing, a valve 10 is shown suitable for use in a fuel pump and the like. The valve 10 is made up of a base 11, a body 12, a valve member 13, and a spring 14.

The base 11 is connected to a valve seat support member 16 by a web 18. The web 18 and the base 11 define a groove 15. The valve seat member 16 is connected to the outer base 11 by the upwardly and inwardly extending web 18. Therefore, the valve seat member 16, the web 18, and an outer portion 17 of the seat member 16 define the the groove 15. The seat support member 16 has a bore 20 therethrough which forms a passage for fluid which may flow between the valve 13 and the seat 16.

The valve member 13 is generally cup-shaped having an indentation 21 in the upper side thereof. The spring 14 which is an ordinary helical spring of suitable dimension rests in the indentation 21. The lower portion of the valve member 13 is dished downward at 23 and the downwardly extending portion 23 extends below the seating surface 24 to act as a centering device. The dished portion 23 is attached to an outer peripheral seating portion 25 by means of a web 27.

The top of the body 12 has an indentation therein defining a spring engaging portion 30 which extends downwardly below horizontal portions of spider legs 31 to extend into the spring 14 and, therefore, locate it. The spider legs 31 extend outwardly radially from the top of the support portion and then downwardly to form a support for the top of the spring engaging portion 30. The legs 31 also locate outer peripheral edges 32 of the valve member 13 itself. Lower ends 37 of the spider legs 31 become larger at the lower ends thereof and have an enlarged portion thereon which is larger in outside diameter at 38 than the groove 15. The enlarged portion 38 forms a snap in fit with an overhanging peripheral bead 39 on the base 11.

It will be noted that the vertical dimension of the seating portion 16 is long and of considerable volume as compared with the web 18 and that since plastic material such as nylon and vinyl plastic is inclined to deform in the vertical dimensions, the substantial cross sectional size of the seating portion 16 will resist warpage and since it is connected to the peripheral member 17 of the body portion 12 by the relatively light web 18 and since the web 18 inclines from the intermediate part of the seating member 16 to the lower part of the base 11, warpage introduced in the base member 11 will not be transferred to the seating member 16. The seating member 16 has a groove 41 along the upper sides thereof which makes a more pronounced seating surface 42.

The valve is molded in four separate parts, that is, the members 11, 12, 13, and 14 as stated. The spring 14 is formed and the body portion 12, the base 11, and the valve 13 are molded into separate pieces. Then the valve member 13 is put into position with its seating surface on the seating surface 42, the spring 14 is supported in the dished portion 23 of the valve member 13, and the body member 12 is put in place and a slight pressure applied thereon in a direction toward the base 11. This will cause the enlarged portion of the base 11 to snap under the bead 39 and hold the valve in assembled relation.

It has been discovered that due to the resiliency of a plastic material used which will be nylon, a vinyl plastic, or other suitable material, the valve has great resistance to being disassembled inadvertently.

The foregoing specification sets forth the invention in its preferred practical forms but the structure shown is capable of modification within a range of equivalents without departing from the invention which is to be understood is broadly novel and is commensurate with the appended claims.

The embodiments of the invention in which an exclusive property or privilege is claimed are defined as follows:

1. A valve comprising a base, said base being in the form of an annular member having a bead around the upper inner peripheral surface thereof and a web attached to the lower inner peripheral surface thereof, an annular seating member having substantially greater height than its thickness, said seating member being disposed concentric to said base and on the inside thereof and spaced therefrom, said seating member being attached to said base by said web, said web being attached to an intermediate point on the outer periphery of said annular seating member, said web and said seating member defining a groove, a seating surface on the upper edge of said annular seating member, a body member, said body member having a dished central portion and legs extending outwardly and downwardly therefrom, an annular member on the lower ends of said legs, said annular member of said legs having a member with an upwardly facing ledge on the lower end of said legs adapted to be inserted between said web and said seating member with said member on said legs disposed below said bead whereby said bead holds said legs in position, a valve member generally cup-shaped and having the peripheral portion thereof of appreciably thick material, the lower surface of said peripheral portion having a seating surface adapted to engage the seating surface of said seating member to form a liquid tight seal therebetween, and a spring disposed between said valve member and said body member urging said valve member into seating engagement with said seating member.

2. A valve comprising a base, a seat support, a valve member, said base, seat support, and valve member being in the shape of hollow cylinders having substantial length relative to their thickness, said seat support being disposed concentric to said base, said valve member being coaxial with said seat support, one end of said valve member having a seating surface thereon, one end of said seat support having a seating surface thereon, said seating surfaces engaging each other, a web extending between said base and said seat support and connected thereto, a web closing one end of said hollow cylinder forming said valve member, a spring engaging said valve member, and means supporting said spring whereby said spring urges said valve member into seating engagement with said seat support, said means supporting said spring comprising a body, radially and downwardly extending legs on said body, the distal ends of said legs having an enlarged portion, and a bead on the upper inner periphery of said base, said distal ends of said legs engaging the inner periphery of said base with said bead overlying the enlarged ends of said legs.

3. The valve recited in claim 2 wherein the enlarged ends of said legs are disposed between said base and said web connecting said seat support and said base.

4. The valve recited in claim 3 wherein said web closing said valve member is dished down and one end of said spring is disposed in said downwardly dished portion of said web, said body having a centrally disposed, downwardly dished end extending into the other end of said spring, locating said spring.

5. A check valve comprising a base, a body, a valve member, said base being made of a relatively thick material, an annular valve seating member disposed generally concentric to said base, said base and said annular member being connected together by a web extending therebetween, said seating member having a valve seating surface on the upper edge thereof, said body having radially extending legs, said legs extending upwardly and then inwardly, said valve member being disposed between said body and said seating member, a seating surface on one side of said valve member, one surface of said valve member resting on said seating surface of said seated member, and a spring, said spring being disposed between said body and said valve member, said spring urging said valve member into engagement with seat seating member, said web connecting said base to said annular seating member being attached to the lower inner peripheral portion of said base and to said seating member above said lower edge of said seating member, said seating member being generally rectangular in cross section, the height thereof being more than twice the thickness, said base having an inwardly extending bead disposed around the upper inner peripheral surface thereof and said body legs having an annular portion thereon, said annular portion engaging said base on the inner periphery thereof and having a ledge underlying said bead holding said body in position.

References Cited in the file of this patent

UNITED STATES PATENTS

| 833,559 | Stebbins | Oct. 16, 1906 |
| 939,987 | Dawley | Nov. 16, 1909 |
| 1,998,444 | Clapp | Apr. 23, 1935 |
| 2,622,842 | Coffey | Dec. 23, 1952 |
| 2,726,843 | Evans | Dec. 13, 1955 |
| 2,752,942 | Travaskis | July 3, 1956 |

FOREIGN PATENTS

| 500,785 | Great Britain | Feb. 15, 1939 |
| 887,897 | Germany | Aug. 27, 1953 |
| 929,174 | Germany | June 20, 1955 |